Nov. 11, 1952 A. RAPPL Re. 23,580

WINDSHIELD WIPER MECHANISM

Original Filed Sept. 10, 1945 3 Sheets-Sheet 1

INVENTOR
ANTON RAPPL
BY
Beau, Brooks, Buckley & Beau.
ATTORNEYS

Nov. 11, 1952 A. RAPPL Re. 23,580

WINDSHIELD WIPER MECHANISM

Original Filed Sept. 10, 1945 3 Sheets-Sheet 2

INVENTOR
ANTON RAPPL
BY
Beau, Brooks, Buckley & Beau
ATTORNEYS

Nov. 11, 1952
A. RAPPL
Re. 23,580
WINDSHIELD WIPER MECHANISM
Original Filed Sept. 10, 1945
3 Sheets-Sheet 3
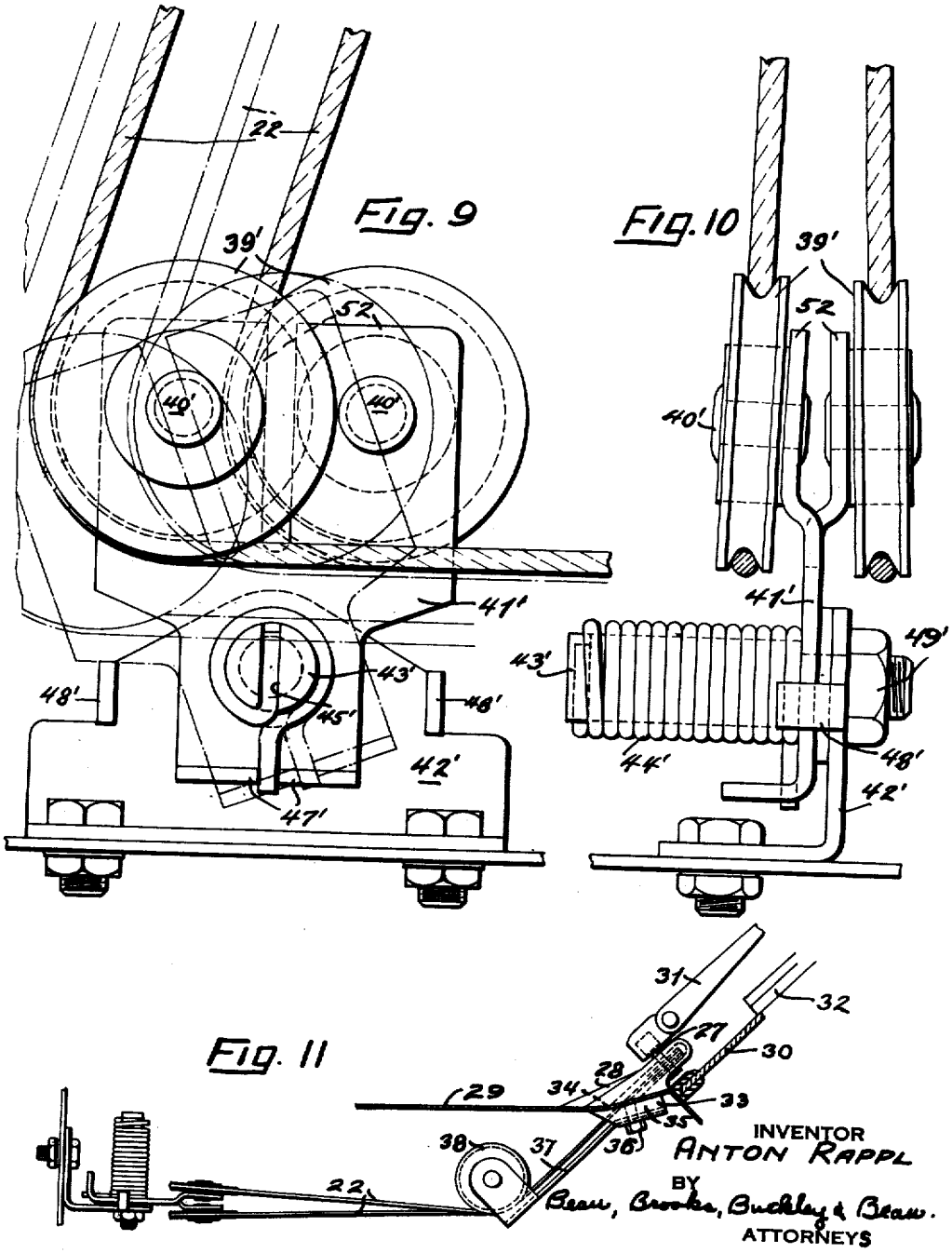
INVENTOR
ANTON RAPPL
BY
Beau, Brooks, Buckley & Beau.
ATTORNEYS Reissued Nov. 11, 1952

Re. 23,580

UNITED STATES PATENT OFFICE 23,580

WINDSHIELD WIPER MECHANISM

Anton Rappl, deceased, late of Eggertsville, N. Y., by Trico Products Corporation, Buffalo, N. Y., assignee Original No. 2,547,285, dated April 3, 1951, Serial No. 615,435, September 10, 1945. Application for reissue January 23, 1952, Serial No. 267,818

24 Claims. (Cl. 15—255)

Matter enclosed in heavy brackets [ ] appears in the original patent but forms no part of this reissue specification; matter printed in italics indicates the additions made by reissue.

This invention relates to the windshield cleaning art and has particular reference to the automatic windshield cleaner field of research. It has heretofore been proposed to operate a windshield wiper through a flexible transmission interposed between the wiper and its drive or source of power but the arrangement has been impractical for the present day vehicle.

The primary object of the present invention is to simplify the cleaner mechanism for a greatly improved wiper action by which greater efficiency is obtained.

A further object of the invention is to provide an improved windshield cleaner construction which will facilitate its installation on the modern automobile; and further to provide a windshield cleaner which, while embodying a flexible transmission, is nevertheless durable and practical and one that may be economically manufactured by mass production methods.

In the drawings:

Figs. 9 and 10 are views similar to Figs. 2 and 3 but showing a modification of the cable support; and Fig. 11 is a fragmentary showing of the cleaner installation from the side of the vehicle.

Figure 2:
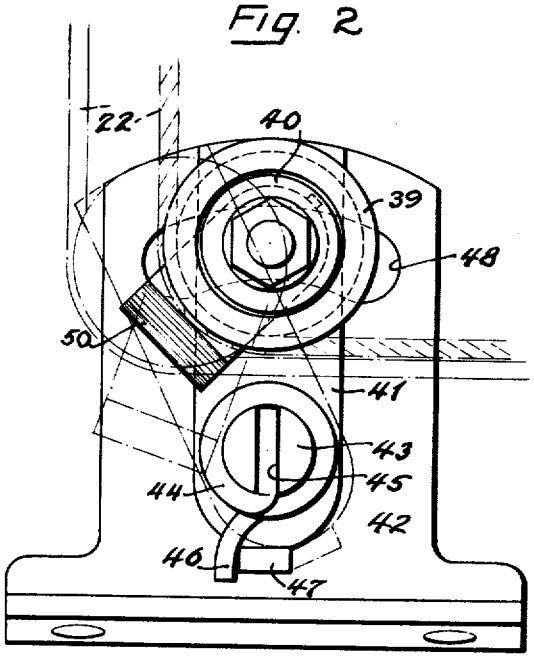
Figs. 2 and 3 are top plan and side elevational views, respectively, of one of the supports for the flexible transmission.
Figure 3:
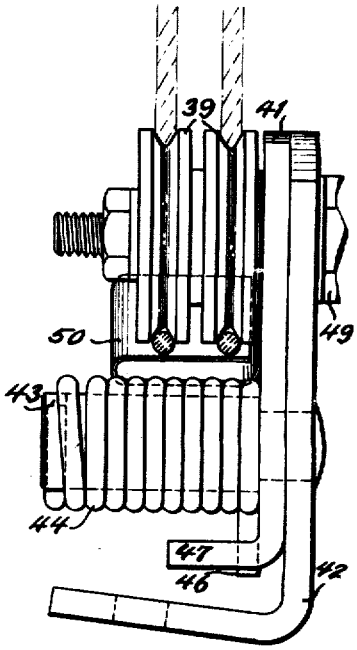
Figure 4:
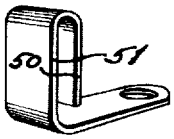
Fig. 4 is a detailed perspective view of the cable guard embodied in the support.

Referring more particularly to Figs. 5 through 8 of the drawings, the numeral 1 designates the source of power, such as the well-known suction operated motor now on the market, the same having an oscilatory shaft 2 carrying a driving head 3 on its free end. The motor may be conveniently mounted on the dash or fire wall 4 of a motor vehicle at the engine side thereof by fasteners 5. This disposes the motor in the engine compartment of the vehicle and is, therefore, accessible by lifting the engine hood.

Figure 7:
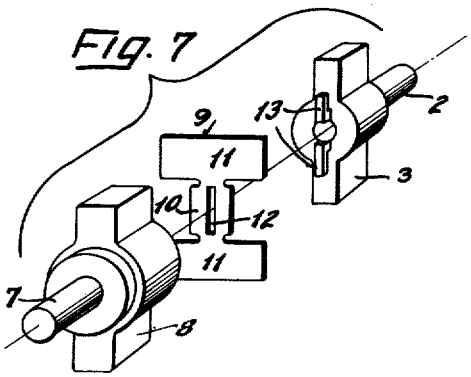
Fig. 7 is an exploded perspective view of the power coupling.
Figure 8:
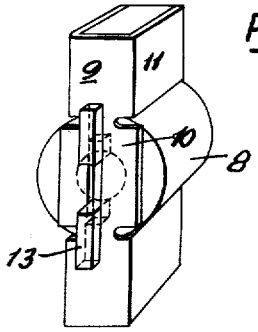
Fig. 8 is a perspective of the driving head of the coupling.
Figure 5:
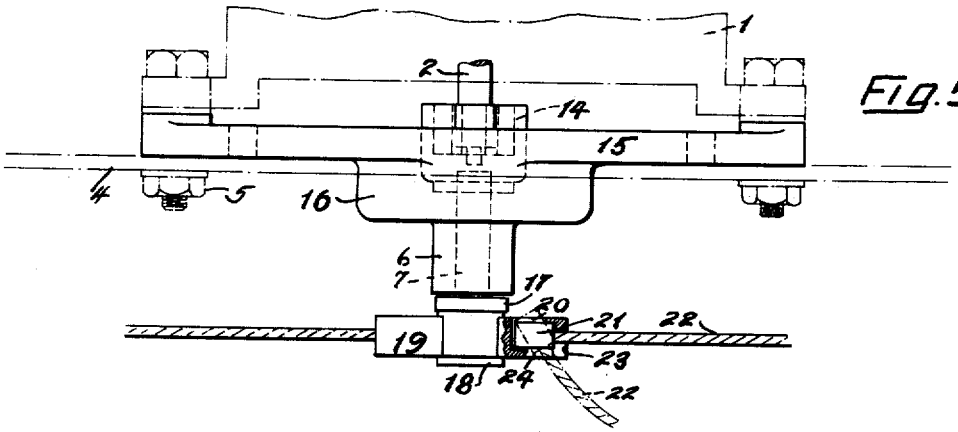
Figs. 5 and 6 are, respectively, top plan and side elevational views of the central drive and power coupling, with portions removed.
Figure 6:
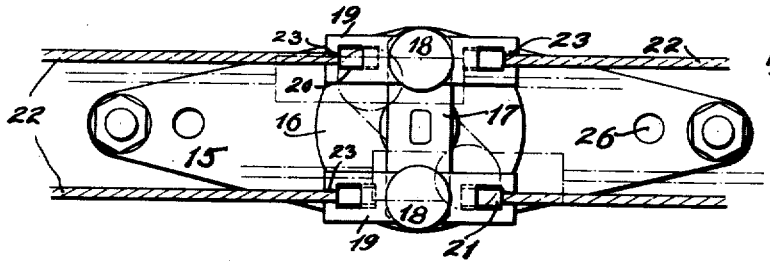

Journaled in a bearing 6 is a driven shaft 7 which carries at its inner end a socketed head 8 designed to interlockingly receive the driving head 3, the two parts constituting a detachable coupling for enabling the motor to be replaced at will. The two heads 3 and 8 extend crosswise of the axis of oscillation and in order to dampen the driving contacts between the two parts, a buffer element 9 is interposed. As shown in Fig. 7, the buffer element may be cut from sheet rubber material and be provided with a web 10 joining upper and lower wings 11, the web being provided with a slot 12 designed to be stretched or otherwise fitted on an overhanging keeper lugs 13 on the crosshead 3 to secure the dampener against accidental displacement. The wing portions 11 fold down against the opposite sides of the driving cross head 3 when the latter is introduced into the socket 14 of the driven head 8. The bearing 6 is a part of a mounting bracket 15 designed to be secured to the fire wall 4 by the fastening bolts 5 and may also be formed with a dome-like part 16 to partly receive the driven head 8 and thereby enclose and protect the coupling.

The opposite end of the driven shaft 7 protrudes from bearing 6 into the passenger compartment of the vehicle, and fixedly carries a cross arm 17. This cross arm is in the nature of a crank part, which term includes gears and other mechanical equivalents, and is therefore provided with a pair of crank pins 18 at its opposite ends. Pivotally mounted on each crank pin is a connector link 19 that extends in opposite directions therefrom and is formed with sockets 20 in its opposite ends to receive the terminal heads 21 of the transmission cable 22. Each terminal head or enlargement is readily detachable from the connector link 19 by displacing the cable from the slot 23, as shown in the broken line in Fig. 5 whereupon the enlargement may be withdrawn from its socket through the entrance opening 24. When connected, the two cables are united into an endless flexible transmission which is readily broken down into its constituent elements for ease of assembly and repair.

From the foregoing it will be observed that the motor may readily be demounted without disturbing the transmission, and likewise the flexible transmission may be readily removed without disrupting the motor unit. If desired, the bracket 15 may be secured to the dash 4 by secondary fastening means 25 passing through openings 26. This secondary fastening means will hold the bracket 15 firmly in place when the motor is removed.

The cable 22 may be formed in two sections extending in opposite directions from the cross arm 17 to and about a wiper operating shaft 27, Fig. 11. This shaft is journaled in a housing 28 surmounting the cowl 29 at the base of the windshield 30. Fixed on the shaft 27 to oscillate therewith is a wiper carrying arm 31 to the outer end of which is connected the wiper 32 in the usual manner. The cable housing 28 has a part 33 depending through an opening 34 in the cowl to receive a clamp 35 for securing the housing in position, the clamp 35 being held by a fastener 36. Also carried by this depending part 33 is a pivotally mounted bracket 37 on which a pair of guide wheels 38 are journaled, these wheels serving to support the cable as it passes upwardly into the hollow housing 28.

Intermediate the driving crank 17 and the wiper shafts 27 the cable is suported at each side of the former by other wheels 39 which are mounted for adjustment to guide as well as tension the cable. These other wheels or pulleys are journaled on a stub shaft 40 carried by an arm 41, the latter being preferably pivoted on a bracket 42 by pin 43. A coil spring 44 encircles this pin and has one end anchored thereto in a slot 45 while the opposite end 46 is hooked about an upstanding lug 47 on the arm 41, with the result that the spring action will tend to rotate the arm with its wheels 39 in a counterclockwise direction about the pin 43, as viewed in Fig. 2. The springs 44 act in opposition to one another and are of sufficient strength to operatively hold the cable properly tensioned at all times while enabling a certain yield should the wipers be obstructed in their movement. The mounting bracket 42 is provided with a slot 48 concentric with respect to the pivot 43, and through this slot extends a clamping bolt having a nut 49 by which the arm 41 may be secured in a fixed relation with the bracket when desired. This will serve to definitely hold the tensioning wheels 39 in a fixed position wherein the cable has been properly tensioned by the spring 44.

The cable portions are held against accidental displacement from the peripheral grooves of the wheels 39 by a spring guard finger 50 which is fixedly secured to the arm 41. The guard finger is formed by a return bend 51 which serves to support the finger for yielding when placing and replacing the cable.

Figure 1:
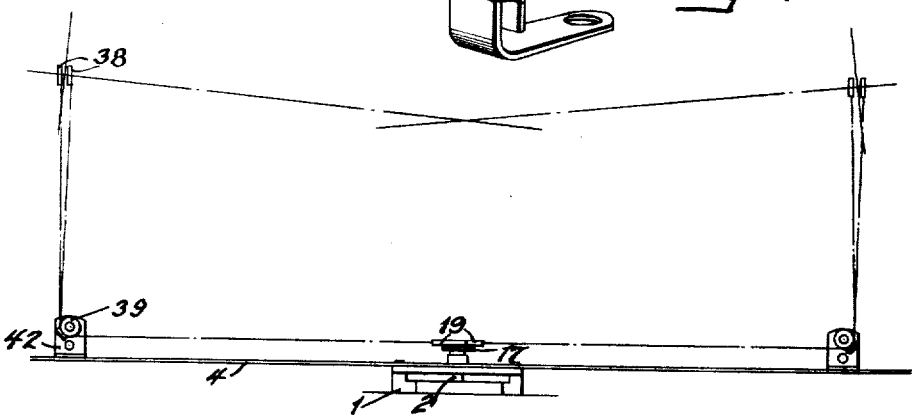
Fig. 1 is a diagrammatic view showing the general arrangement of the windshield cleaner.

In its modified form shown in Figs. 9 and 10, the bracket 42', through the swingable arm 41', supports the two wheels or pulleys 39' off center the one from the other with their axes or shafts 40' being spaced a distance equal to the spacing of the cables at the guide wheels 38. Consequently, the cables will not converge from the guide wheels 38, as depicted in Fig. 1, but will extend parallel throughout the distance between the pulleys 38 and 39', as depicted in Fig. 9. This offsetting of the pulleys 39', therefore, causes the cables to feed truly into and out of the grooves of pulleys 38 from chafing on the side walls. Furthermore, the stub shafts 40' are relatively inclined sufficiently to dispose the grooves of their pulleys 39' in planes tangential to the respective guide wheels 38, as shown in Fig. 11. This avoids chafing of the cables as they operate over the tensioning pulleys. To facilitate this disposition of the pulleys the arm 41' is bifurcated to provide individual pulley supporting parts 52 which may readily be shaped for accomplishing the intended purpose. Upstanding stops 48' on the bracket determine the limit of swing for the arm, while the bolt extension, with its cooperating nut 49', secures the arm at its fixed adjustment. The bolt extension forms an axial continuation of the pivot pin 43' about which the coil spring 44' is mounted, one end of the spring being anchored in the diametral slot 45' while its opposite end is engaged between the upstanding lugs 47'.

In either embodiment the flexible cables are maintained taut and should the clamp nuts 49 (49') loosen the cables will nevertheless be supported with a proper tension. If the cables stretch in use it is only necessary to momentarily loosen the clamp nuts and then retighten them after the springs absorb the slack. Furthermore, by loosening the nuts the cable terminal heads 21 may easily be disengaged against the tension of the springs 44 (44'). Slight variations in the length of the terminally headed cables will be accommodated by the tensioning pulleys.

The foregoing description has been given for clearness of understanding and not by way of limitation since the inventive principles involved are capable of assuming other physical embodiments without departing from the spirit of the invention and its claimed scope.

What is claimed is:

1. A motor vehicle windshield cleaner comprising spaced wiper actuating shafts, a drive therefor arranged in the engine compartment of the vehicle and having a drive shaft, a flexible transmission arranged in the passenger compartment of the vehicle and operatively connecting the two shafts, said transmission having a driven shaft arranged between the two wiper actuating shafts and provided with opposed cranks connected thereto by oppositely extending tension members, means detachably coupling the drive and driven shafts to enable demounting of the drive shaft through the engine compartment, and bracket means independent of the drive providing journal support for the driven shaft when the drive shaft is removed.

2. A windshield cleaner comprising a wiper actuating shaft, a drive therefor having a drive shaft, a flexible transmission interposed between and operatively connecting the two shafts, said transmission having a driven shaft with oppositely extending crank parts on opposite ends thereof, means providing journal support for the driven shaft between its ends, and means detachably coupling the drive shaft to the crank parts on one end of the driven shaft to enable demounting of the drive, said flexible transmission including oppositely extending cables removably engaged in seats on the crank parts at the opposite end of the driven shaft.

3. A windshield cleaner comprising a wiper actuating shaft, a drive therefor having a drive shaft, a driven shaft, means providing journal support for the driven shaft between its ends, means detachably coupling the drive shaft to one end of the driven shaft to enable demounting of the drive, a crank part fixed on the opposite end of the driven shaft, a connector link pivotally carried by the crank part and having opposed seats, and a pull cable operatively connected to the actuating shaft and having terminal heads engaged in the seats of the connector link whereby said crank part will actuate the wiper shaft.

4. A windshield cleaner comprising a wiper, an oscillatory shaft, an arm driven by the shaft and carrying the wiper, a drive therefor having a drive shaft, the two shafts having fixed journal support, a flexible transmission interposed between and operatively connecting the two shafts, said transmission including a driven shaft and a flexible pull member operatively connecting the driven shaft to the actuating shaft for oscillating the latter, guide means supporting angularly related intermediate portions of the flexible pull member, and means resiliently mounting the guide means for shock absorbing slack in the flexible pull member while normally holding the latter in tension.

5. A windshield cleaner comprising a wiper, an oscillatory shaft, an arm driven by the shaft and carrying the wiper, a drive therefor having a drive shaft, the two shafts having fixed journal support, a flexible transmission interposed between and operatively connecting the two shafts, said transmission including a driven shaft and a flexible pull member operatively connecting the driven shaft to the actuating shaft for oscillating the latter, guide means supporting angularly related intermediate portions of the flexible pull member, and means resiliently mounting the guide means for placing a constant tensioning upon the flexible member but yieldable to accommodate abnormal resistance to the wiper movement.

6. A windshield cleaner comprising a wiper actuating shaft, a drive therefor having a drive shaft, a flexible transmission having a driven shaft and a flexible pull member operatively connecting the driven shaft to the actuating shaft for oscillating the latter, means connecting the drive shaft to the driven shaft, a guide wheel about which is taken the intermediate portion of the flexible pull member, means adjustably mounting the guide wheel for absorbing slack in the flexible pull member, and a guard overhanging the peripheral groove to retain the flexible pull member therein, said guard being yieldable to permit manual placement and displacement of the flexible pull member.

7. A windshield cleaner comprising a wiper actuating shaft, a second shaft for oscillating the same and having a crank part with a seat, a transmission cable operatively connected to the wiper actuating shaft and having one end detachably engaged in the seat by the tension of the cable while being removable from the seat upon slackening the cable, and cable tensioning means serving to guide the cable and acting to maintain the cable in tension to secure its end in the seat.

8. A windshield cleaner comprising a wiper actuating shaft, a second shaft for oscillating the same and having a crank part, a transmission cable operatively connected to the wiper actuating shaft and having two pull sections extending side by side from the latter, a guide for the cable sections arranged adjacent the wiper actuating shaft and having a pair of arcuate guide grooves through which the cable sections extend, said cable sections being connected to the crank part for being pulled thereby alternately, and tensioning means interposed between the crank part and the guide and including a pair of pulleys having their cable receiving grooves spaced radially one from the other a distance substantially equal to the spacing of the guide grooves whereby to maintain the cable sections parallel therebetween, the axes of the two pulleys being relatively inclined to dispose the pulley grooves in planes tangential to the guide grooves.

9. A windshield cleaner comprising a wiper, an actuating shaft therefor, a second shaft having a crank part with a seat and a lateral entrance opening leading to the seat, a transmission cable operatively connecting the two shafts and including a terminal head engageable through the entrance opening with the seat upon tensioning the cable, a cable guide supporting the intermediate portion of the cable and acting to absorb slack in the cable, and resilient means acting to move the guide in a slack take-up direction to maintain the cable in tension and thereby hold the head engaged in its seat, said resilient means being yieldable to enable disengagement of the head from the seat.

10. A windshield cleaner comprising a mounting bracket, a shaft journaled therein and having a crank part on one end and a coupling part on the other at opposite sides of the bracket for mounting and demounting therewith as a unit, said coupling part having a socket opening in an axial direction, a motor detachably mounted on the bracket and having a shaft with a head slidably fitting in the socket and thereby detachably connecting with the first coupling part, a wiper actuating shaft, and means operatively connecting the latter to the crank part.

11. A windshield cleaner comprising a mounting bracket, a shaft journaled therein and having a crank part on one end and a coupling part on the other for mounting and demounting as a unit with the bracket, a motor detachably mounted on the bracket and having a shaft with a coupling part detachably connecting with the first coupling part by a telescopic fit incidental to the placement of the motor, one coupling part being in the form of a crosshead and the other coupling part having a socket to receive the crosshead, a sound damping element in the form of a sheet interposed between the two coupling parts and conformed to the socket by and upon placement of the head, a wiper actuating shaft, and means operatively connecting the latter to the crank part.

12. A windshield cleaner comprising a mounting bracket, a shaft journaled therein and having a crank part on one end and a coupling part on the other for mounting and demounting as a unit with the bracket, said coupling part having a socket opening in an axial direction, a motor detachably mounted on the bracket and having a shaft with a head slidably fitting in the socket by and during placement of the motor for detachably connecting with the first coupling part, the bracket having a recess in which the coupled parts are housed, a wiper actuating shaft, and means operatively connecting the latter detachably to the crank part.

13. A windshield cleaner comprising a mounting bracket, a shaft journaled therein and having a crank part on one end and a drive coupling part on the other for mounting and demounting as a unit with the bracket, a pair of wiper actuating shafts, an endless flexible transmission member operatively connecting the two wiper shafts and including connector links pivoted on the crank part at opposite sides of the supporting shaft axis, each link having seats in its opposite ends, said transmission member also having portions detachably engaged in the seats, and means for tensioning the flexible transmission member.

14. A windshield cleaner comprising a mounting bracket, a shaft journaled therein and having a crank part on one end and a drive coupling part on the other for mounting and demounting as a unit with the bracket, a pair of wiper actuating shafts, an endless flexible transmission member operatively connecting the two wiper shafts and including connector links pivoted on the crank part at opposite sides of the supporting shaft axis, each link having seats in its opposite ends, said transmission member also having pairs of pull cable portions leading into the connector links from opposite sides of the crank supporting shaft, the cable portions having heads detachably engaged in the seats and retained therein by supporting the cable portions in tension, and means for so supporting the cable portions in tension.

15. A windshield cleaner comprising spaced wiper actuating shafts, an oscillatory shaft interposed therebetween and having a crank part with oppositely extending arms, an endless transmission cable operatively connected to the two shafts and having its oppositely moving flight portions connected intermediate their ends to the respective arms of said crank part to thereby constitute the latter a sustaining spacer for the flight portions, pulleys supporting the flight portions and guiding them to the oscillatory crank arms, and means resiliently supporting the pulleys for yielding in accommodation of the relative lateral motion between the flight portions toward and from each other incidental to the oscillatory movement of the crank arms while maintaining the cable taut.

16. A windshield cleaner comprising spaced oscillatory wiper shafts, each carrying a wiper and an actuating arm, a crank shaft interposed between the wiper shafts and having oppositely extending crank arms, a cable section for each wiper shaft operatively connected thereto and having its opposite ends connected to the crank arms for being pulled back and forth thereby, with the cable terminal portions of one section extending in the opposite direction from those portions of the companion cable section, the three shafts having relatively fixed journaled bearings, and resilient means interposed between the crank shaft and each wiper shaft and supporting the intermediate parts of the respective cable sections under tension to so hold them taut while yielding to abnormal wiper-movement resistance to permit the continued operation of the two other shafts and the companion wiper.

17. A windshield cleaner comprising a wiper, an oscillatory shaft, an actuating arm connecting the wiper to the shaft, a power shaft having oppositely extending crank parts, a pair of cables each connecting a respective crank part to the first shaft, said power shaft being oscillated to pull first on one cable and then on the other cable for oscillating the first shaft to actuate the wiper, and resiliently mounted means supporting angularly related parts of each cable between the two shafts, said supporting means acting to accommodate an abnormal pull upon either cable independently of the companion cable in the presence of abnormal resistance to wiper movement.

*18. A windshield cleaner comprising an oscillatory wiper shaft, a drive shaft, a flexible cable transmission operatively connecting the two shafts, the drive shaft acting to pull first on one portion of the cable transmission and then on another portion of the cable transmission to oscillate the wiper shaft, and a tensioner acting on the cable transmission and including relatively movable parts with spring means acting yieldably to impart relative movement between such parts to take up cable transmission slack to a predetermined tautness, and means operable on said parts to fixedly relate them for securing the spring-adjusted tautness of the cable transmission and for rendering the spring means inoperative.*

*19. A wiper actuating shaft, a drive shaft, a flexible cable transmission operatively connecting the two shafts and having two flights on which the drive shaft alternately pulls to oscillate the actuating shaft and its connected wiper, a spring actuated cable tightener acting on the cable transmission to impart a predetermined degree of tautness thereto, and means operable to secure the cable tightener in its spring adjusted position to fix the spring-determined tautness in the cable for operating independently of the spring.*

*20. A wiper actuating shaft, a drive therefor, an endless cable transmission having opposed pull portions on which the drive alternately pulls first in one direction and then in the opposite to oscillate the shaft, a spring actuated tightener acting to tension the cable transmission to a predetermined degree of tautness, and manually operable means to secure the tightener against spring-responsive movement for fixing the cable transmission tautness to the spring-determined degree.*

*21. A windshield cleaner comprising a wiper actuating shaft, a second shaft for oscillating the same, one shaft having an oscillatory part with a seat, a transmission cable operatively connected to the wiper actuating shaft and having one end detachably engaged in the seat and so held by the tension on the cable while being removable from the seat upon slackening the cable, and cable tensioning means acting to place the cable under tension to secure its end in the seat and including a locking device that is manually operable to fix the tension on the cable to that determined by the tensioning means.*

*22. A windshield cleaner comprising a wiper, an actuating shaft therefor, a second shaft having a rotatable part with a seat and a lateral entrance opening leading to the seat, a transmission cable operatively connecting the two shafts and including a terminal head engageable through the entrance opening with the seat, resilient means acting to place the cable under a predetermined tension to hold the head engaged in its seat, and manually operable means to secure the resilient tensioning means inoperable to fix the tension in the cable as determined by the resilient means.*

*23. A windshield cleaner comprising an oscillatory wiper shaft, a drive shaft, a flexible cable transmission operatively connecting the two shafts, the drive shaft acting to pull first on one portion of the cable transmission and then on another portion of the cable transmission to oscillate the wiper shaft, and a tensioner acting on the cable transmission and including relatively movable parts about which the cable passes, with spring means acting yieldably to impart relative rotary movement between such parts about a fixed axis, to take up cable slack in tensioning the cable to a predetermined tautness, and means operable on said parts to fixedly relate them for fixing the spring-adjusted tautness of the cable and for rendering the spring means inoperative.*

*24. A windshield cleaner comprising a wiper, an oscillatory actuating shaft therefor, a second shaft, one of said shafts having a rotatable part with a seat and an entrance opening leading to the seat, a transmission cable means operatively connecting the two shafts and including a terminal head engageable through the entrance opening with the seat, resilient means acting to*

*place the cable means under a predetermined tension to hold the head engaged in its seat, and manually operable means to secure the resilient tensioning means inoperable to fix the tension in the cable means as determined by the resilient means.*

TRICO PRODUCTS CORPORATION,
*Assignee of Anton Rappl, Deceased,*
By J. R. OISHEI,
*President.*

REFERENCES CITED

The following references are of record in the file of this patent:

UNITED STATES PATENTS

| Number | Name | Date |
|---|---|---|
| 1,192,317 | Illingworth | July 25, 1916 |
| 1,370,684 | Demand | Mar. 8, 1921 |
| 1,374,643 | Fishbach | Apr. 12, 1921 |
| 1,491,834 | Van Loozen | Apr. 29, 1924 |
| 1,660,520 | Nilson | Feb. 28, 1928 |
| 1,851,791 | Waters | Mar. 29, 1932 |
| 2,129,542 | Wernert et al. | Sept. 6, 1938 |

FOREIGN PATENTS

| Number | Country | Date |
|---|---|---|
| 408,318 | Great Britain | Apr. 9, 1934 |
| 647,032 | Germany | June 25, 1937 |
| 841,385 | France | Feb. 6, 1939 |

Certificate of Correction

Reissue No. 23,580 November 11, 1952

ANTON RAPPL, DECEASED, by Trico Products Corporation

It is hereby certified that error appears in the printed specification of the above numbered patent requiring correction as follows:

Column 8, lines 13, 60, 63, 64, and 66, after "*cable*" insert *transmission*;

and that the said Letters Patent should be read as corrected above, so that the same may conform to the record of the case in the Patent Office.

Signed and sealed this 31st day of March, A. D. 1953.

[SEAL]

THOMAS F. MURPHY,
*Assistant Commissioner of Patents.*